United States Patent [19]

Nishihara

[11] 3,995,493
[45] Dec. 7, 1976

[54] DIFFERENTIAL PRESSURE TRANSDUCER

[75] Inventor: Tadashi Nishihara, Tokyo, Japan

[73] Assignee: Yokogawa Electric Works, Ltd., Tokyo, Japan

[22] Filed: Mar. 3, 1975

[21] Appl. No.: 554,491

[30] Foreign Application Priority Data

Mar. 8, 1974 Japan .................. 49-27454

[52] U.S. Cl. .................. 73/393; 73/398 R; 73/407 R; 336/30
[51] Int. Cl.² .................. G01L 9/10; G01L 13/02
[58] Field of Search .......... 73/398 R, 407 R, 393; 336/30; 340/199

[56] References Cited

UNITED STATES PATENTS

| 2,999,386 | 9/1961 | Wolfe | 73/407 R X |
|---|---|---|---|
| 3,238,479 | 3/1966 | Church | 336/30 |
| 3,241,359 | 3/1966 | Glerum | 73/393 X |
| 3,274,833 | 9/1966 | Ollivier et al. | 73/398 X |
| 3,350,945 | 11/1967 | Bristol | 73/398 R |
| 3,444,736 | 5/1969 | Stedman | 73/398 R X |
| 3,492,872 | 2/1970 | Caspar et al. | 73/407 |
| 3,820,400 | 6/1974 | Rasso | 73/407 R |
| 3,894,435 | 7/1975 | Shimada et al. | 73/393 |

Primary Examiner—Richard C. Queisser
Assistant Examiner—Daniel M. Yasich
Attorney, Agent, or Firm—Parmelee, Johnson & Bollinger

[57] ABSTRACT

An improved differential pressure transducer includes a chamber divided by a non-magnetic, electrically conductive measuring diaphragm supported between two support members each of which has a cavity covered with a seal diaphragm. Differential pressure of an incompressible fluid medium to be measured and transduced is applied to the measuring diaphragm, the displacement of which is detected by magnetic core detection coils. The detection coil magnetic cores are joined to the support members through spaces of magnetic material having temperature dependent characteristics opposite to that of the cores to thus neutralize temperatures induced effects. The inductance change in the detection coil upon displacement of the measuring diaphragm provides an electrical signal corresponding to the differential pressure through the provision of an oscillation circuit supplying AC signals to the coils, a control circuit controlling, to a constant value, the sum of the currents in the coils and a circuit for deriving the current differences as an output signal. Advantageously, the oscillation frequency of the output signal of the oscillation circuit is selected to be approximately the resonant frequency of the detection coils.

7 Claims, 13 Drawing Figures

DIFFERENTIAL PRESSURE TRANSDUCER

BACKGROUND OF THE INVENTION

1. Field of the Invention

The present invention relates to differential pressure flow measurement and more particularly to differential pressure transducers capable of transducing such differential pressure into an electric signal. It is a general practice to measure process flow by inserting a restrictive means, such as an orifice, in the process pipe line to obtain a pressure difference before and after the restrictive means. This differential pressure corresponds to the flow of the fluid passing through the pipe line. This differential pressure may be utilized in a differential pressure transducer to cause a displacement of means, such as a diaphragm, and such displacement can be detected by electrical devices and converted into measurable electrical signals propotional to the displacement and hence to pressure differential and fluid flow.

2. Description of the Prior Art

Figures 1, 2A:
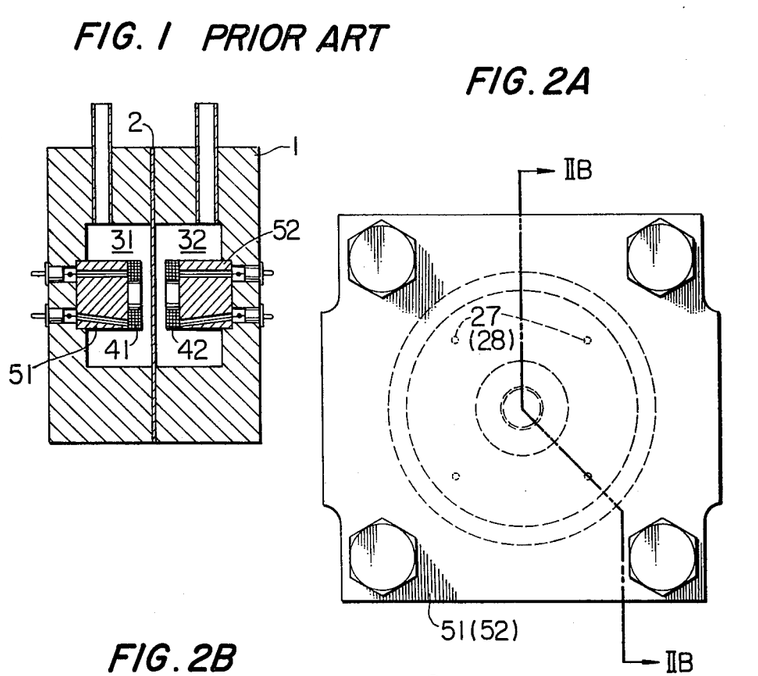
FIG. 1 is a sectional view illustrating one example of a prior art transducer.
FIG. 2A is a plan view thereof.

A prior art differential pressure transducer is disclosed in U.S. Pat. Nos. 3,238,479 and 3,336,525. The general construction of such a transducer is illustrated, as an aid to better understanding of the present invention, in sectional view in FIG. 1. Referring to FIG. 1, there is seen a diaphragm 2 located in the center cavity of a case 1. The pressure of the fluid being measured is led into two chambers 31 and 32 which are separated by the diaphragm 2. A pressure difference developed between the two chambers displaces the diaphragm 2. This displacement is detected by detection coils 41 and 42 on the principle of eddy current production. The case 1, the diaphragm 2, and the cores 51 and 52 of the detection coils of such a transducer are made of non-magnetic material, and the transducer is simple in construction.

However, such prior art transducers have drawbacks. For example, electrical energy may leak from the detection coils since these coils are in direct contact with the fluid being measured. This undesirably decreases the safety sought in pressure-resistant and explosion-proof instruments. Furthermore, if an excess pressure is led into the transducer, the diaphragm 2 is likely to be subject to excessive deformation and a permanent strain may be introduced into the diaphragm. Moreover, if it is desired to detect the differential pressure with high accuracy, specific steps must be taken such as, for example, increasing the frequency of AC power supplied to the detection coils, because the case 1, the diaphragm 2, and the cores 51 and 52 are made of non-magnetic material. Thus, such prior art transducer possesses practical limitations for flow measurements in the process industry.

SUMMARY OF THE INVENTION

The aforementioned disadvantages are overcome according to this invention with the provision of an improved differential pressure transducer advantageously suited to industrial process measurements and providing increased safety and explosion-proof operation, minimum sensitivity to temperature variation, high sensitivity and operable in a linear differential pressure versus output electrical signal characteristic. Harmful measurement diaphragm deformation and hysteresis of the diaphragm are eliminated.

The foregoing is accomplished according to one preferred embodiment of the invention by providing an improved differential pressure transducer structure in which a measuring diaphragm made of electrically conductive material is disposed in a cavity between two juxtaposed support members or bodies and defines with them two chambers. The support members have cavities which are covered with seal diaphragms fastened at the peripheries of the support bodies. Detection coils with cores made of magnetic material are disposed in each of the support bodies so that these coils face opposite sides of the measuring diaphragm, spaced therefrom across a small gap. A connecting passageway is provided in each support member, of which one opening is disposed in the support body chamber at a position a predetermined given distance from the detection coil. Through this passageway, the chambers formed on the side of the measuring membrane communicates with the cavity covered by the seal diaphragm. The passageway, the chambers and the cavities are filled with an incompressible seal fluid medium. When pressure to be measured is applied to each side of the seal diaphragms, this pressure is exerted on both sides of the measuring diaphragm through the fluid. As a result, the measuring diaphragm is displaced to either side to a length corresponding to the pressure difference. This displacement is transduced into an electric signal by the detection coils on the principle of eddy current production.

The measuring diaphragm is advantageously held between the support members by a pressure clamping relationship rather than by welding to eliminate the hysteresis of the diaphragm. Harmful deformation and permanent strain of the measuring diaphragm is avoided by providing the support member cavity with a curved hollow surface that limits the movement or displacement of the seal diaphragm when excess pressure is applied thereto, thus limiting also the pressure transmitted to the measuring diaphragm to a predetermined amount. In the event that the detection coils should be caused to spark, the spark energy will, for the most part, dissipate itself through leakage through the passageways and into the cavities covered by the seal diaphragms, all of which contain the seal fluid, and be attenuated thereby.

The magnetic cores of the detection coils are joined to the support members through spacers which may be located at positions where magnetic fluxes produced by currents flowing in the detection coil means pass and which are advantageously made of a magnetic material whose temperature affected characteristics are opposite to those of the magnetic material used to form the cores in order that the two will neutralize one another and thus reduce the influence of temperature changes on measurement.

An electrical circuit is capable of detecting the displacement of the measuring diaphragm with high accuracy and may be operated with low power, thus making it advantageous for industrial measuring applications. An oscillation circuit applies an AC signal to the detection coils producing an AC flux which induces an eddy current in the measuring diaphragm producing another flux opposing that of the coils and changing with displacement of the diaphragm. A control circuit controls the sum of the currents flowing in the detection coils, which change differentially corresponding to the diaphragm displacement, to a constant value. A circuit for deriving the difference between the currents flowing in the two detection coils improves linearity and can reduce relative error due to temperature changes to zero. The oscillation frequency of the ouput signal of the oscillation circuit may advantageously be selected to be approximately equal to the resonant frequencies inherent in the detection coils, thus increasing detection sensitivity while removing zero point variation due to variation in the frequency of the oscillation.

Accordingly, it is a feature of this invention to provide a differential pressure transducer suited for industrial process flow measurements.

Another feature of this invention is the provision of a differential pressure transducer of increased safety in use, high sensitivity, capable of operation free of influence by temperature changes and operable in a linear differential pressure versus output electrical signal characteristic.

The foregoing and other objects, aspects and advantages of the invention will be more apparent from the detailed description herein below, considered together with the following drawings in which:

BRIEF DESCRIPTION OF THE DRAWINGS

FIG. 2 illustrates the structional features of one embodiment of a transducer according to the invention; more particularly.

FIG. 8 illustrates, in graphical representation, frequency characteristics of admittances Y1 and Y2 of the detection coils used in the circuit of FIG. 7; more particularly.

DESCRIPTION OF THE PREFERRED EMBODIMENT

Figure 2B:
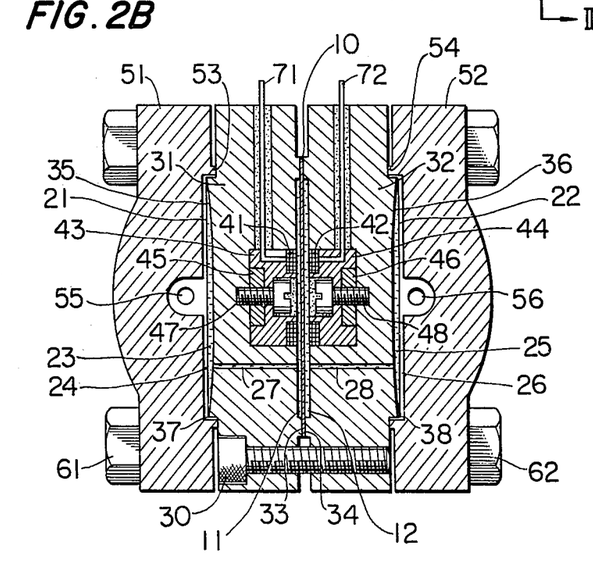
FIG. 2B is a cross-sectional view taken across line B—B of FIG. A.

Referring to FIG. 2B, there is shown a differential pressure transducer according to an embodiment of this invention. The reference numeral 10 denotes a measuring diaphragm comprised of a flat disk made of a material such as beryllium copper, having a high electrical conductivity and mechanical strength. Seal diaphragms, 21 and 22 are each comprised of a flat, corrosion resistant metal disk about 0.1 mm thick. The support members 31 and 32, support the measuring diaphragm 10 and the seal diaphragms 21 and 22. The numerals 41 and 42 represent detection coils disposed in the support members or bodies 31 and 32 respectively so that each coil faces the measuring diaphragm 10 across a small gap. The numerals 51 and 52 represent enclosures or cases, while 71 and 72 indicate electrical leads.

The support members have raised portions 33 and 34 along their peripheries which are placed in juxtaposition to clampingly hold the measuring diaphragm 10. A secure hold is obtained by the raised portions 33 and 34 by fastening the support members 31 and 32 together with a screw 30. In this construction, the interior of the support members or bodies 31 and 32 is divided into two chambers by the measuring diaphragm 10. Such construction permitting the measuring diaphragm 10 to be supported by the support bodies 31 and 32 by clamping pressure of the raised portions 33 and 34 is advantageous because the hysteresis of the measuring diaphragm is eliminated unlike a construction in which the measuring diaphragm is supported on the bodies by welding.

The other sides of the support bodies 31 and 32 have curved surface hollow cavities 35 and 36 respectively so that these surfaces fit those of the seal diaphragms 21 and 22 when these diaphragms are displaced. The seal diaphragms 21 and 22 cover the hollow surfaces 35 and 36 and are fastened to the peripheries 37 and 38 of the cavities by welding, soldering or the like. Thus, the interior cavity formed within the support body 31 and the case 51 is divided into two chambers 23 and 24 by the seal diaphragm 21. The curved surface of the cavity 35 serves as the back-up surface of the seal diaphragm 21. When an excess pressure is applied, the seal diaphragm 21 comes into complementary contact with the curved surface to limit its displacement and thus prevent the measuring diaphragm 10 from being excessively deformed or bent. Similarly, the interior formed within the support body 32 and the case 52 is divided into two chambers 25 and 26 by the seal diaphragm 22. The curved surface of the cavity, 36 serves as the back-up surface of the seal diaphragm 22.

A pressure guiding passageway 27 is disposed in the support body 31 so that its opening is located at a position a given distance from the detection coil 4. The chambers 11 and 23 on both sides of the support body 31 communicate with each other through the connecting passageway 27. Similarly, another pressure guiding passageway 28 is disposed in the support body 32 so that its opening is located at a position a predetermined given distance from the detection coil 42. The chambers 12 and 25 on both sides of the support body 32 communicate with each other through the connecting passageway 28. The distance from the detection coil to the opening of the passageway depends on the size of the detection coil and on the current flowing through the detection coil and can be chosen accordingly.

The chamber 11, passageway 27, chambers 23 and 12, passageway 28, and chamber 25 are filled respectively with seal fluid of incompressible type. Therefore, the pressure exerted on one of the seal diaphragms is transmitted accurately to one side of the measuring diaphragm by way of the seal fluid. The total volume of the spaces filled with the seal fluid is very small since both the measuring diaphragm and the seal diaphragms are of flat disk shape, and hence the volumes of the chambers 11, 12, 23 and 25 can be minimized. The change in the volume of the seal fluid due to temperature changes is nearly uniformly absorbed by the seal diaphragms 21 and 22. Accordingly, the effects due to the change in the volume of the seal fluid can be minimized.

The detection coils 41 and 42 are wound on cores 43 and 44 made of a magnetic material such as stainless steel or ferrite. These cores are positioned at approximately the centers of the support bodies 31 and 32, respectively, and secured thereto with the screws 47 and 48 through the spacers 45 and 46. In the event that a spark from the detection coils 41 or 42 occurs due to a short circuit or other failure, the spark energy will leak out through the passageways 27 and 28, the seal fluid inside the chambers 23 and 25, and the seal diaphragms 21 and 22. Nevertheless, even if such occurs, the most part of the energy is attenuated while it is passing through the relatively long distance from the passageways to the seal diaphragms, and the explosion-proof properties of the instrument are enhanced.

The spacers 45 and 46 may be advantageously made of a magnetic material the temperature-dependent properties of which, such as linear expansion coefficient, are opposite to those of the magnetic material used to form the cores 43 and 44. This is advantageous because the changes in the properties of the spacers and those of the cores due to temperature changes can cancel and neutralize each other thus reducing the influence of temperature changes on measurement.

The cases 51 and 52 have raised portions 53 and 54 in their periphery which cooperate with and fit the surfaces of the support bodies 31 and 32, and are secured thereto with the bolts 61 and nuts 62, in such manner that the raised portions cover the seal diaphragms 21 and 22, respectively. Thus, the case 51 and the seal diaphragm 21 form a closed chamber 24. Similarly, the case 52 and the seal diaphragm 22 form a closed chamber 26. The cases 51 and 52 have passageway means 55 and 56 which are led to the chambers 24 and 26 respectively, for communicating with the differential pressure to be measured.

The transducer of this invention operates in the following manner. The differential pressure to be measured is led into the chambers 24 and 26 through the passageway means 55 and 56 and applied to the seal diaphragms 21 and 22. The pressure on the seal diaphragm is transmitted to the chambers 11 and 12 by way of the seal fluid. The measuring diaphragm 10 is consequently displaced toward the chamber in which the pressure is lower than in the other by a length corresponding to the pressure difference. That is, the measuring diaphragm 10 is displaced until the force exerted on the diaphragm 10 by the differential pressure becomes equal to the force produced in the measuring diaphragm due to its displacement. This displacement is detected by the detection coils 41 and 42 in terms of inductance change whereby an electrical signal corresponding to the differential pressure is obtained.

Figure 3:
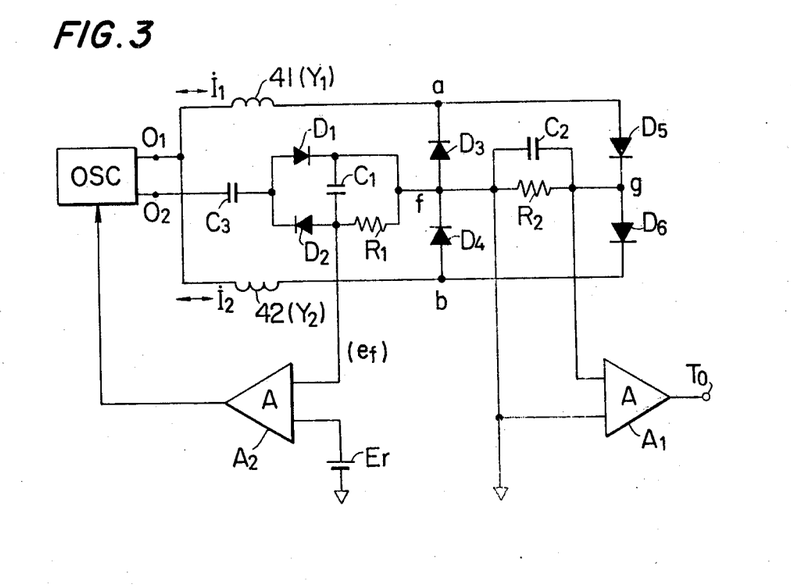
FIG. 3 diagramatically illustrates an electrical circuit used according to the invention.

FIG. 3 is a diagram showing an electrical circuit including the detection coils 41 and 42. This circuit is designed to be capable of detecting, with high accuracy (e.g., an error below 0.1%), the displacement (e.g., 0.1mm at maximum differential pressure) of the measuring diaphragm. The circuit is also capable of operation with low power and hence is advantageously suited for industrial measuring applications. Referring to FIG. 3, the numerals 41 and 42 represent the detection coils, as shown in FIG. 2B, the references $D_1$ to $D_6$ represent diodes, $C_1$ to $C_3$, capacitors, $R_1$ and $R_2$, resistors, $A_1$ and $A_2$, amplifiers, OSC an oscillator for supplying an AC signal to the detection coils 41 and 42, Er, a reference voltage source, and To, an output terminal.

The diodes $D_3$ to $D_6$ together with diodes $D_1$ and $D_2$, as will be explained below, set up a bridge circuit. A series circuit of the detection coils 41 and 42 is connected between the power supply terminals $a$ and $b$ of the bridge circuit. A parallel circuit of the capacitor $C_2$ and the resistor $R_2$ is connected between the electrical detection terminals $f$ and $g$ of the bridge circuit. The oscillator OSC operates on the output voltage of the amplifier $A_2$; one output terminal $O_1$ of the oscillator is connected to the junction between the detection coils 41 and 42, and the other output terminal $O_2$ is connected through the capacitor $C_3$ and the diode $D_1$ to the electrical detection terminal $f$ of the bridge circuit. A series circuit of diode $D_2$ and the capacitor $C_1$ is connected in parallel to the diode $D_1$, and the resistor $R_1$ is connected in parallel to the capacitor $C_1$. The amplifier $A_1$ has one input terminal connected to the detection terminal $g$ of the bridge circuit, and the other input terminal connected to the detection terminal $f$ thereof. The amplifier $A_2$ has one input terminal connected to the junction between capacitor $C_1$ and diode $D_2$ and resistor $R_1$, and the other input terminal connected to the reference voltage source Er.

Figure 4:
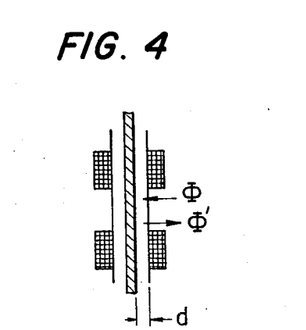
FIG. 4 is a schematic illustration of the principles on which the transducer operates for detecting the displacement of the measuring diaphragm.

This above described circuit operates in the following manner. When an AC signal is applied to the detection coils 41 and 42, currents flow in these coils in quantities corresponding to their admittances $Y_1$ and $Y_2$ respectively. As a result, an AC flux $\Phi$ is produced around the detection coils 41 and 42, as illustrated in FIG. 4. This flux induces an eddy current in the measuring diaphragm 10 which is made of an electrically conductive material. This eddy current serves to produce another flux $\Phi'$ which opposes the flux $\Phi$. The resultant decrease in the flux $\Phi$ corresponds accurately to the displacement of the measuring diaphragm 10. This flux change corresponds to the change in the differential admittance component of the two detection coils 41 and 42.

The currents $I_1$ and $I_2$ flowing in the coils 41 and 42 change differentially as the admittance components of these coils change differentially corresponding to the displacement of the measuring diaphragm. Assume, for example, a half-cycle where the oscillator output $O_1$ is positive and $O_2$ negative. During this half-cycle, the current $I_1$ of the coil 41 flows by way of: $D_5 - R_2(C_2) - D_2 - C_3$, and the current $I_2$ of the coil 42 flows by way of: $D_4 - R_1(C_1) - D_2 - C_3$. Therefore, during this half-cycle period, a voltage corresponding to current $I_1$ flowing in the detection coil 41 is stored in the capacitor $C_2$, and a voltage corresponding to the sum of currents $I_1$ and $I_2$ flowing in detection coils 41 and 42 is stored in the capacitor $C_1$. During the next half-cycle where the oscillator output $O_1$ is negative and $O_2$ positive, the current $I_1$ flows by way of $C_3 - D_1 - D_3$, and the current $I_2$ flows by way of $C_3 - D_1 - R_2(C_2) - D_6$. In this half-cycle, therefore, a voltage corresponding to the current $I_2$ of the coil 42 is stored in the capacitor $C_2$. Thus, during the full cycle, a voltage corresponding to the difference between the currents $I_1$ and $I_2$ flowing in the coils 41 and 42 is stored in the capacitor $C_2$, and a voltage corresponding to the sum of the currents $I_1$ and $I_2$ is stored in the capacitor $C_1$.

Figure 5:
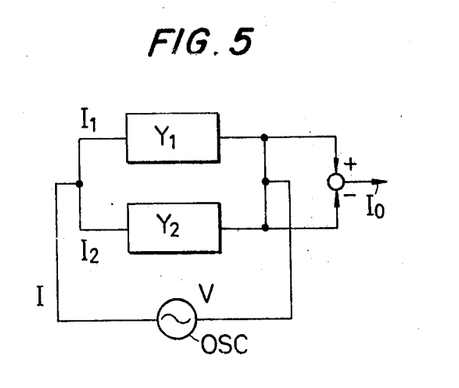
FIG. 5 diagramatically illustrates a circuit equivalent to that shown in FIG. 3.
Figure 6:
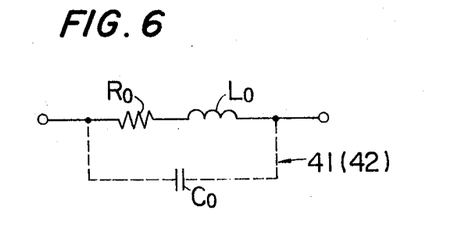
FIG. 6 diagramatically illustrates an equivalent circuit of the detection coil used according to the invention.

FIG. 5 shows an equivalent circuit of that shown in FIG. 3. In FIG. 5, $Y_1$ stands for the admittance of the circuit consisting essentially of the detection coil 41, and $Y_2$ the admittance of the circuit consisting essentially of the detection coil 42. As shown in FIG. 6, the admittance $Y_1(Y_2)$ is composed of the inductance $L_0$, resistance $R_0$, and stray capacitance $C_0$ of the detection coil 41(42), the values of which depend on the number of turns of the detection coil, the thickness of the coil wire, the shape of the coil, the shape and material of the coil bobbins, and so on.

In the equivalent circuit of FIG. 5, the following conditions hold.

$$I = V(Y_1 + Y_2) \quad (1)$$
$$I_1 = VY_1 \quad (2)$$
$$I_2 = VY_2 \quad (3)$$
$$I_0 = I_1 - I_2$$

$$\left. \begin{array}{l} = V(Y_1 - Y_2) \\ = I \dfrac{Y_1 - Y_2}{Y_1 + Y_2} \end{array} \right\} \quad (4)$$

where
V: the voltage of AC signal from the oscillator OSC
I: the current of AC signal from the oscillator OSC
$I_0$: the output current In Eq. (4), the output current $I_0$ is proportional to the difference between the admittances $Y_1$ and $Y_2$, or to the ratio $Y_1-Y_2/Y_1+Y_2$, provided that the voltage V or current I of the oscillator OSC is kept constant. In the circuit shown in FIG. 3, the input to the amplifier $A_2$ is the reference voltage Er, and the voltage $e_f$ which corresponds to the sum of currents $I_1$ and $I_2$ stored in the capacitor $C_1$. The power source of the oscillator OSC is controlled so that $e_f$ and Er are equal in a given value. Thus, the sum of the currents $I_1$ and $I_2$ which flow in the detection coils 41 and 42 is controlled to be constant. Hence, the output current $I_0$ corresponds to the change in the admittances $Y_1$ and $Y_2$.

Assume, for example, that the output current $I_0$ is zero (zero point), and the admittances $Y_1$ and $Y_2$ are the same (i.e., $Y_0$) when the measuring diaphragm 10 is in a balance state. Then, when admittance changes $\Delta Y_1$ and $\Delta Y_2$ occur due to disturbance, and the admittance of one circuit changes from $Y_1$ to $Y_0+\Delta Y_1$, and the admittance of the other circuit changes from $Y_2$ to $Y_0+Y_2$, Eqs. (1) and (4) may be rewritten as $$I = V(2Y_0 + \Delta Y_1 + \Delta Y_2) \quad (5)$$
$$I_0 = V(\Delta Y_1 - \Delta Y_2) \quad (6)$$

By eliminating V from Esqs. (5) and (6), $I_0$ is given as $$I_0 = \dfrac{I(\Delta Y_1 - \Delta Y_2)}{2Y_0 + \Delta Y_1 + \Delta Y_2} \quad (7)$$

In Eq. (7), when the measuring diaphragm 10 is displaced, the admittance changes $\Delta Y_1$ and $\Delta Y_2$ occur differentially and equally. Therefore, when $\Delta Y_1 = -\Delta Y_2 = \Delta Y$, Eq. (7) is rewritten as $$I_0 = I \cdot \dfrac{\Delta Y}{Y_0} \quad (8)$$

This indicates that the output current $I_0$ corresponds accurately to the admittance changes of the detection coils 41 and 42, that is, the displacement of the measuring diaphragm 10. Because the output signal corresponds to the admittance difference, the linearity can be improved.

In Eq. (7), the admittances $\Delta Y_1$ and $\Delta Y_2$ change with changes in temperature, resulting in the change in the zero point of the output signal and consequently a zero point error. Assume, for example, that the changes in admittances due to temperature changes are $\Delta Y_{11}$ and $\Delta Y_{21}$, and that these admittance changes are sufficiently smaller than the admittance change $\Delta Y$ which corresponds to the displacement of the measuring diaphragm. When $\Delta Y_{11} = m\Delta Y$, and $\Delta Y_{21} = n\Delta Y$ (where $m, n \ll 1$), the output current $I_{0Z}$ for the zero shift is obtained from Eq. (7) as $$I_{0z} = \dfrac{I(m\Delta Y - n\Delta Y)}{2Y_0 + m\Delta Y = n\Delta Y} \quad (8)$$

Because $2Y_0 \ll m\Delta Y, n\Delta Y$, $$I_{0z} = I \cdot \dfrac{m\Delta Y - n\Delta Y}{2Y_0} \quad (9)$$

Hence the relative error caused by temperature change can be determined as follows according to Esq. (8) and (9).

$$\text{Relative Error} = \dfrac{I \dfrac{m\Delta Y - n\Delta Y}{2Y_0}}{I \dfrac{\Delta Y}{Y_0}}$$

$$= \dfrac{m - n}{2} \quad (10)$$

Eq. (10) signifies the fact that the relative error due to temperature changes can be reduced to zero by making equal the values of admittance changes $\Delta Y_{11}$ and $\Delta Y_{21}$ to each other (i.e., $m = n$ in Eq. (10) even if these admittance changes are of significant value.

Figure 7:
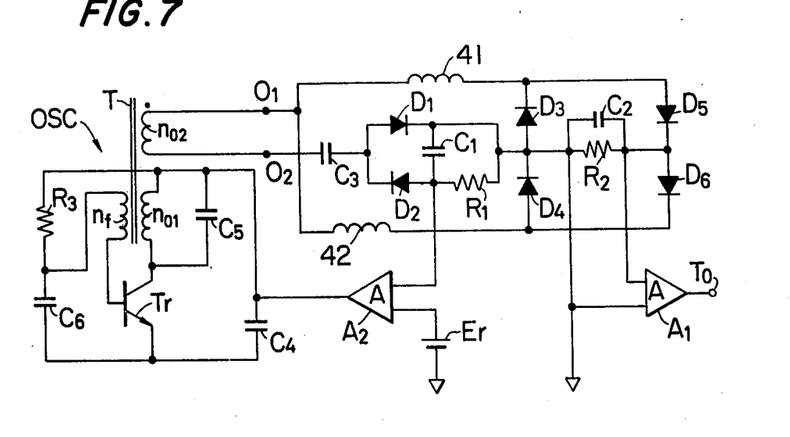
FIG. 7 diagramatically illustrates a transducer circuit according to the invention.

FIG. 7 shows an electric circuit used according to the invention. This circuit is basically the same as one shown in FIG. 3 and like circuit elements are indicated by like references used in FIGS. 3 and 7. The oscillator OSC is constituted of a back-coupling type oscillator using a transistor Tr and a transformer T and oscillates at the resonant frequency of the tuning circuit having an output coil $n_{01}$ and a capacitor $C_5$, and the oscillation amplitude depends on the voltage stored in a capacitor $C_4$. In this circuit, the oscillation frequency of the oscillator OSC is selected or determined to be approximately equal to the resonant frequencies inherent in the detection coils 41 and 42 whereby the detection sensitivity is increased and zero point variation due to variation in the frequency of the oscillator is removed, as described in greater detail below.

Figure 8A:
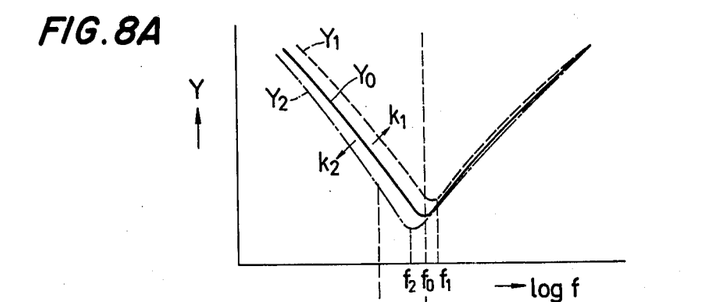
FIG. 8A shows changes in the values of Y1 and Y2.

FIG. 8A shows frequency characteristics of the admittances of detection coils 41 and 42 driven by the oscillator OSC. In FIG. 8A, $Y_0$ is the admittance of the detection coils 41 and 42 when the measuring diaphragm 10 is in its center position (i.e., balance position). In this state, the admittances of the two detection coils are nearly the same, and a resonant characteristic having resonant frequency $f_0$ is obtained. The symbols $Y_1$ and $Y_2$ denote admittances of the detection coils 41 and 42 when the measuring diaphragm 10 is displaced. The characteristics of the two admittances $Y_1$ and $Y_2$ slightly deviate from that of $Y_0$ in the arrowmarked directions $k_1$ and $k_2$ respectively. Accordingly, their resonant frequencies deviate slightly from $f_0$ to $f_1$ and $f_2$ respectively.

Figure 8B:
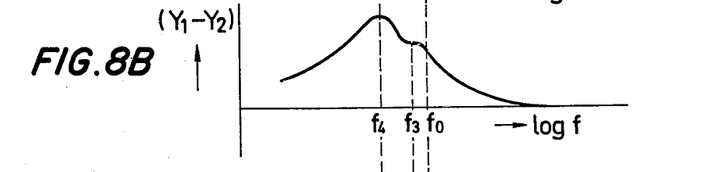
FIG. 8B, changes in the value of Y1–Y2.
Figure 8C:
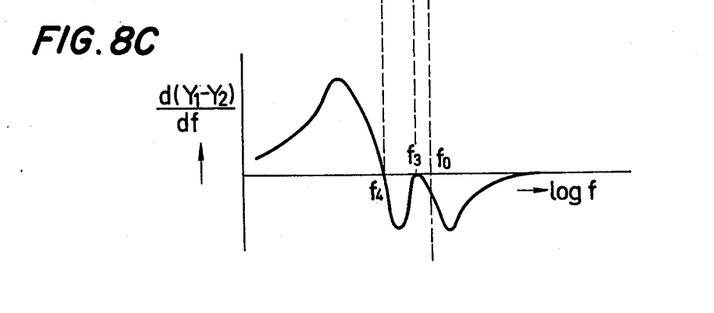
FIG. 8C, changes in the value of d(Y1–Y2)/df.

FIG. 8B shows a frequency characteristic of the difference admittance ($Y_1 - Y_2$) when the measuring diaphragm 10 is displaced. FIG. 8C shows a frequency characteristic obtained by differentiating the difference admittance ($Y_1 - Y_2$) with respect to frequency $f$.

As shown in FIGS. 8B and 8C, the difference admittance ($Y_1 - Y_2$) of the detection coils 41 and 42 becomes maximum at frequencies around the resonant frequency $fo$ of the detection coils 41 and 42, especially at $f_3$ and $f_4$, and the differentiated admittance $d(Y_1 - Y_2)/df$ crosses the frequency axis at frequencies $f_3$ and $f_4$ where $d(Y_1 - Y_2)$ assumes zero value.

Increase in the value ($Y_1 - Y_2$) signifies the fact that, as indicated by Eq. (4), the output current $I_0$ increases and the sensitivity also increases. The value of $d(Y_1 - Y_2)/df$ being zero or nearly zero indicates that sensitivity change with changes in frequency is zero or nearly zero.

Figure 9:
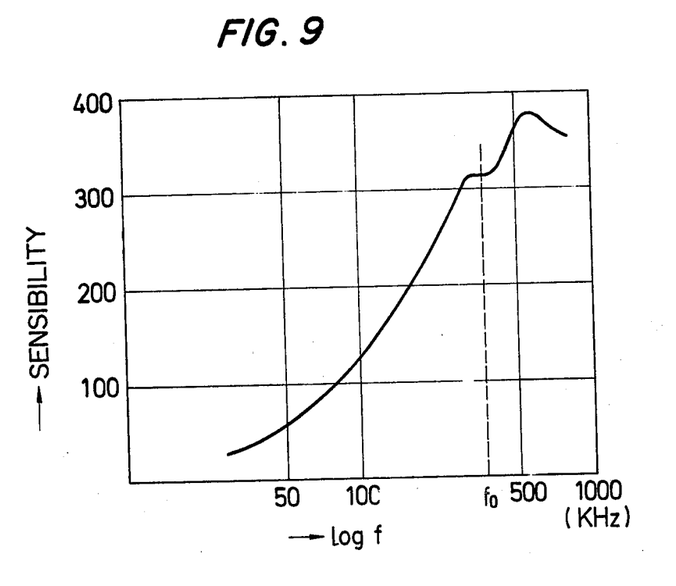
FIG. 9 illustrates, in graphical representation, a sensitivity versus frequency characteristic of the circuit shown in FIG. 7.
Figure 10:
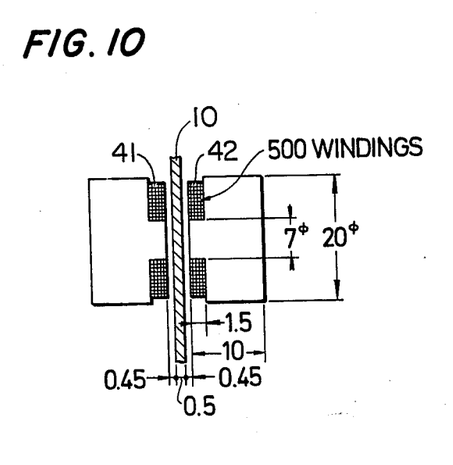
FIG. 10 is a schematic illustration showing the geometry of a specific detection coil relevant to the characteristic shown in FIG. 9.

FIG. 9 shows a sensitivity versus frequency characteristic of the circuit as a whole. This characteristic was obtained through experiments where detection coils of the configuration as shown in FIG. 10 were used. In FIG. 10, the distance from the end of the detection coil to the measuring diaphragm is 0.45 mm, and the input displacement of the measuring diaphragm is 0.25 mm.

As can be seen from FIG. 9, the sensitivity increases with increase in the frequency as a whole; however, there is a stable region at around the resonant frequency $f_o$ of the detection coil where the sensitivity does not change with changes in frequency. In this region, the zero point of the output signal and the value of span remain unchanged even if the frequency changes in a small amount.

The circuit shown in FIG. 7 uses a simple oscillator of self-excited type comprising a transformer T. When such a simple oscillator is used, variations in frequency of the output signal are inevitable. As in the above embodiment, by choosing the oscillation frequency of the oscillator OSC to be around the resonant frequency of the detection coil, the detecting sensitivity and stability can be increased and at the same time the zero point and span value can be made unchanged even if the oscillation frequency of the oscillator changes slightly.

While in the foregoing embodiment a differential pressure transducer, the measuring diaphragm 10 is held between the support bodies 31 and 32 in clamp-like fashion and secured thereto by fastening the support bodies with screw 30, it will be understood by those skilled in the art that other securing means may be utilized. Thus, the measuring diaphragm 10 may be secured to the support bodies 31 and 32 by welding or the like. Also, while in the above described embodiment, four passageways 27 and 28, see FIG. 2A, are provided to allow chambers on both sides of the support bodies 31 and 32 to communicate with each other a different number may be provided. Hence, instead, one or more than four passageways may be disposed.

I claim:
1. A differential pressure transducer comprising
a pair of support members maintained in juxtaposition with one another,
a non-magnetic, electrically conductive measuring diaphragm supported between the support members, each support member and the measuring diaphragm defining a measuring chamber on a side of the measuring diaphragm,
each support member having a cavity,
passageway means connecting the measuring chamber and cavity of each support member,
seal diaphragm means positioned over the cavity of each support member to seal the cavity,
means enabling the application of the differential pressure to be transduced to the surfaces of the seal diaphragms exterior to the cavities,
incompressible fluid occupying the measuring chambers, passageway and cavities,
detection coil means having cores of magnetic material disposed in each of the support members spaced from the passageway and positioned so as to be capable of detecting displacement of the measuring diaphragm by inducing eddy currents in the measuring diaphragm and by producing admittance changes in the coil means arising upon displacement of the measuring diaphragm,
an oscillation circuit for supplying AC signals to the detection coil means,
a control circuit for maintaining the sum of the currents flowing in the two detection coil means at a constant value, and
a circuit for deriving the difference between the currents flowing in the two detection coil means as an output signal.

2. A differential pressure transducer as claimed in claim 1 wherein the measuring diaphragm is clampingly supported between the two support members to minimize hysteresis thereof.

3. A differential pressure transducer as claimed in claim 1 wherein the support member cavities define curved hollow surfaces to which may be juxtaposed, in complementary relationship, the seal diaphragms, upon full displacement thereof, to limit such displacement to a predetermined amount and thereby limit displacement of the measuring diaphragm.

4. A differential pressure transducer as claimed in claim 1 wherein the magnetic cores of the detection coil means are mounted within the support members on spacer means, the spacer means are located at positions where magnetic fluxes produced by the currents flowing in the detection coil means pass, and the magnetic materials of the cores and of the spacer means are different such that the temperature dependent properties of the two are opposed in order to cause the effects of temperature changes on the cores and spacers to neutralize one another.

5. A differential pressure transducer as claimed in claim 1 wherein the means enabling the application of the differential pressure to the seal diaphragms includes case means enclosing the seal diaphragms and forming closed chambers and passageway means communicating with the chambers and their exterior for introduction of fluid, the pressure differential of which is being transduced.

6. A differential pressure transducer as claimed in claim 1 wherein the oscillation frequency of the output signal of the oscillation circuit is selected to be approximately the resonant frequency of the coils of the detection coil means.

7. A differential pressure transducer comprising:
two support members,
a measuring diaphragm of non-magnetic, electrically conducting material positioned between the support members,
means for fastening the support members together to clampingly hold the measuring diaphragm therebetween,
chamber means defined by the support members at each side of the measuring diaphragm,
detection coil means located in the support members at the center of the chamber means, the detection coil means being positioned to face the measuring diaphragm and be spaced therefrom across a small gap distance, the detection coil means having cores of magnetic material, an oscillation circuit for supplying AC signals to the detection coil means, a control circuit for maintaining the sum of the currents flowing in the two detection coil means at a constant value, and a circuit for deriving the difference between the currents flowing in the two detection coil means as an output signal, fluid pressure guiding passageway means within each of the support members communicating with the two sides of the support member, one of the openings of the passageway means being located in the chamber at a predetermined distance from the detection coil means, the other opening of the passageway means being located in a cavity formed in a side of the support member, seal diaphragm means covering the cavity formed in the side of the support member and fixedly fastened thereto, the cavity having a hollow curved surface adapted to limit the displacement of the seal diaphragm, case enclosure means enclosing the seal diaphragm and forming therewith a closed space, passageway means communicating with the closed space and adapted to receive in communication the differential pressure to be transduced, and incompressible fluid filling the chambers, passageways and cavities of the support members to transmit pressure on the seal diaphragm means to the measuring diaphragm.

* * * * *

UNITED STATES PATENT OFFICE
CERTIFICATE OF CORRECTION

Patent No. 3,995,493                    Dated December 7, 1976

Inventor(s) Tadashi Nishihara

It is certified that error appears in the above-identified patent and that said Letters Patent are hereby corrected as shown below:

Column 8, line 14     After "Because" change "$2Y_0 \ll$" to --$2Y_0 \gg$--

Signed and Sealed this

First Day of March 1977

[SEAL]

Attest:

RUTH C. MASON
*Attesting Officer*

C. MARSHALL DANN
*Commissioner of Patents and Trademarks*